(12) United States Patent
Sharma et al.

(10) Patent No.: US 8,184,210 B2
(45) Date of Patent: May 22, 2012

(54) DIGITAL RADIO FREQUENCY (RF) MODULATOR

(75) Inventors: Vivek Mohan Sharma, New Delhi (IN); Sheetal Kumar Jain, Andra (IN)

(73) Assignee: STMicroelectronics International, Amsterdam (NL)

( * ) Notice: Subject to any disclaimer, the term of this patent is extended or adjusted under 35 U.S.C. 154(b) by 1183 days.

(21) Appl. No.: 11/841,678

(22) Filed: Aug. 20, 2007

(65) Prior Publication Data

US 2008/0068512 A1  Mar. 20, 2008

(30) Foreign Application Priority Data

Aug. 22, 2006 (IN) .......................... 1878/DEL/2006

(51) Int. Cl.
*H04N 5/40* (2006.01)
(52) U.S. Cl. ....................................................... 348/724
(58) Field of Classification Search .......... 348/723–724; 375/295–315, 268, 270, 277, 300–300 D
See application file for complete search history.

(56) References Cited

U.S. PATENT DOCUMENTS

| | | | | |
|---|---|---|---|---|
| 5,623,317 A * | 4/1997 | Robinson et al. | ............. | 348/584 |
| 6,265,949 B1 * | 7/2001 | Oh | ................................. | 332/103 |
| 6,313,772 B1 * | 11/2001 | McNeely | ...................... | 341/143 |
| 6,317,167 B1 * | 11/2001 | McNeely | ...................... | 348/724 |
| 6,466,277 B1 * | 10/2002 | McNeely | ...................... | 348/724 |
| 6,724,439 B1 * | 4/2004 | Horwitz | ........................ | 348/724 |
| 7,847,864 B1 * | 12/2010 | Jaffe et al. | ...................... | 348/724 |
| 2003/0053556 A1 * | 3/2003 | Maulik | ......................... | 375/296 |
| 2004/0022178 A1 * | 2/2004 | Kishi | ............................. | 370/204 |
| 2004/0100588 A1 * | 5/2004 | Hartson et al. | ................ | 348/608 |

\* cited by examiner

*Primary Examiner* — Joseph P Hirl
*Assistant Examiner* — Carmine Malangone
(74) *Attorney, Agent, or Firm* — Gardere Wynne Sewell LLP

(57) ABSTRACT

A digital radio frequency (RF) modulator provides modulation for base-band TV signals. The RF modulator provides direct conversion of digital base-band audio and video signals to a desired RF channel frequency, without any analog up conversion. The RF modulator includes an audio module, a video module, and a RF converter. The audio module includes a pre-emphasis filter, a multi-stage audio interpolator and a complex frequency modulator to generate frequency modulated (FM) audio signals. The video module includes a complex VSB filter, a group-delay compensation filter and some processing logic to generate a filtered output video signal. The RF converter includes a complex adder, a complex multiplier and a RF interpolator to construct the base band TV signals and to shift the base band TV signals in a frequency domain to the desired RF channel frequency. The exponential video carrier is generated at baseband and has a frequency whose value is in the range of +/−13.5 MHz. The RF interpolator includes a zero pad logic followed by a quadrature band pass filter (BPF), and an optional second stage of another zero-pad logic followed by a real band pass filter (BPF). The second stage is optional in the sense that it is required only if the desired RF channel is in the higher VHF band.

31 Claims, 9 Drawing Sheets

DIGITAL RADIO FREQUENCY (RF) MODULATOR

PRIORITY CLAIM

The present application claims priority from Indian Patent Application No. 1878/Del/2006 of the same title filed Aug. 21, 2006, the disclosure of which is hereby incorporated by reference.

BACKGROUND

1. Technical Field

This invention relates to a field of digital signal processing, and more specifically to a digital radio frequency RF) modulator, which is used for modulation of an RF sinusoidal carrier with a base band TV signal.

2. Description of Related Art

Modulation can be defined as an alteration of some characteristic of a known signal or waveform, i.e., a carrier, as a function of some unknown signal or waveform that conveys information. In radio-frequency (RF) communication systems, the carrier is typically a sinusoid, and there are several methods of modulating the carrier. These include linear modulation, angle modulation, and various types of pulse modulation. As defined in the ITU-R BT.470 standard, the standard definition (SD) video signal AM-VSB (Amplitude Modulation—Vestigial Side Band) modulates a vision carrier and the audio signal FM (frequency modulation) modulates an audio carrier.

In conventional systems the pulse code modulation (PCM) audio signal frequency modulates a carrier whose frequency is the difference in frequency between the vision carrier and the audio carrier. The frequency modulated carrier is added to a base band video signal. The resulting signal is then shifted to an intermediate frequency, called an IF frequency. At the IF frequency the signal is vestigial side band (VSB) filtered and then translated to a desired channel frequency for broadcasting.

In earlier systems, the entire transmission pipeline is implemented in an analog domain using analog signal processing concepts. With the advancement of digital VLSI design and evolution of System-On-Chip concepts, it was desired to reduce the system cost by converging the functionality of discrete on-board components into cost effective integrated circuits (ICs). As a first step in this direction, today the pipeline up to the IF stage has been widely replaced by digital components, followed by a D/A converter and an analog RF converter circuit to the desired TV channel frequency. To implement the RF converter block using digital logic, a very high sampling rate is required. Digital logic operated at a higher sampling rates have the problems of higher power consumption, difficulty in meeting timing requirements and a higher circuit area. Thus, it is difficult to replace the RF converter circuit by digital components.

Thus, there is a need for a digital RF modulator which operates in a digital domain for modulating the base band TV signals to a desired channel frequency without requiring an analog up conversion.

SUMMARY OF THE INVENTION

An embodiment of an RF modulator provides a generic channel frequency and generates a sinusoid carrier signal at a lower sampling rate for enhancing efficiency. In this RF modulator, the band pass filter for selecting the required channel is implemented in polyphase structure which is quite circuit area efficient.

In an embodiment, a digital RF modulator utilizes an efficient digital architecture for modulating a desired channel carrier with the baseband TV signal without any analog up conversion for frequencies up to a higher VHF band.

In an embodiment, a digital RF modulator provides a generic channel frequency and generates the sinusoidal carrier at a lower sampling rate for enhancing efficiency.

In an embodiment, a digital RF modulator utilizes low sampled sine waves and a poly-phase implementation of band pass filters (BPFs) which are circuit area efficient.

In an embodiment, a digital radio frequency (RF) modulator for modulating a desired RF channel carrier with a baseband TV signal, comprises:

an audio modulator for receiving input audio signals to generate frequency modulated (FM) audio signals; a video modulator for receiving a composite video base-band signal (CVBS) to generate a filtered output video signal, and a RF converter connected to said audio modulator and said video modulator for constructing the base band TV signal and for shifting said base band TV signal in a frequency domain to the desired RF channel carrier.

The audio modulator as described above comprises:

a pre-emphasis filter for amplifying high frequency input audio signals; a multi-stage audio interpolator connected to said pre-emphasis filter for increasing audio sampling rate of pre-emphasized audio signals; and a complex frequency modulator connected to said multi stage audio interpolator in which an exponential sinusoid carrier is frequency modulated with the interpolated audio samples.

The video modulator as described above comprises:

an optional interpolator for up-sampling the incoming CVBS signal by a factor of 2 if the incoming CVBS signal sample rate is 13.5 MHz (this block is not required if the incoming CVBS signal sample rate is already at 27 MHz); a group delay compensation filter connected to said digital circuit for pre-correcting non linear phase characteristics of a receiver; an IRE level adjustor connected to said group delay compensation filter for scaling the incoming CVBS signals and for adding a DC value that represents the channel carrier addition at the baseband and the addition required for appropriate IRE level adjustment; and a complex VSB filter connected to said IRE level adjustor for generating the vestige of one of the sidebands and limiting the bandwidth of the other sideband in order to avoid video interference into the audio spectrum.

The RF converter as described above comprises:

a complex adder for adding the frequency modulated (FM) complex audio carrier and the VSB filtered video signal to form the base band TV signal; a complex frequency shifter connected to said complex adder for multiplying said base band TV signal with an exponential carrier to shift said base band TV signal by the frequency of the exponential carrier; and a RF interpolator connected to said complex frequency shifter for generating modular output at a higher sample rate.

Further, in another embodiment, a RF module for converting digital base band audio signals and digital video TV signals to a desired RF channel carrier, comprises:

a RF modulator for modulating base-band TV signals at the desired RF channel carrier; a PCM/SPDIF interface connected to the RF modulator through an audio interface for providing audio samples to said RF modulator; a digital encoder connected to the RF modulator through a video interface for converting input video signals into composite video base-band signals (CVBS); a digital circuit connected to the RF modulator through a processing interface for configuring the said RF modulator; a digital to analog converter block (DAC) connected to said RF modulator through an output interface for converting the modulated RF carrier from digital to analog domain; and an analog low pass filter block connected to said DAC block for retaining only the fundamental spectrum and rejecting the images of fundamental spectrum.

Further, in an embodiment, a method of modulating base band TV signals to a desired RF channel carrier, comprises:

processing input audio signals to generate frequency modulated (FM) audio signals through an audio modulator; processing input composite video base-band (CVBS) signals to generate a filtered output video signal through a video modulator; adding the frequency modulated (FM) audio signals and the filtered output video signals to form the base band TV signals through a RF converter; and shifting the base band TV signals in a frequency domain to the desired RF channel carrier through the RF converter.

BRIEF DESCRIPTION OF THE DRAWINGS

The present invention is described with the help of accompanying drawings, wherein.

DETAILED DESCRIPTION OF THE INVENTION

A digital radio frequency (RF) modulator is provided for modulating a sinusoid carrier of desired frequency with a baseband TV signal. The frequency shifting on the base band TV signal is done at a 27 MHz sample rate. This enables the generation of the effective channel carrier frequency at a much lower frequency (27 MHz).

The modulated carrier at base band is up-converted from 27 MHz to the desired sample rate and the desired image around the RF carrier is captured using a quadrature band pass filter (BPF).

For applications which require the channel to be in a higher VHF band, the interpolation factor for the base band TV signal becomes high and the process of interpolation followed by band pass filtering (BPF) could be split in multistage. The BPF and the up-sampling have been combined to implement the BPF in a polyphase structure, which is quite area efficient.

Figure 1:
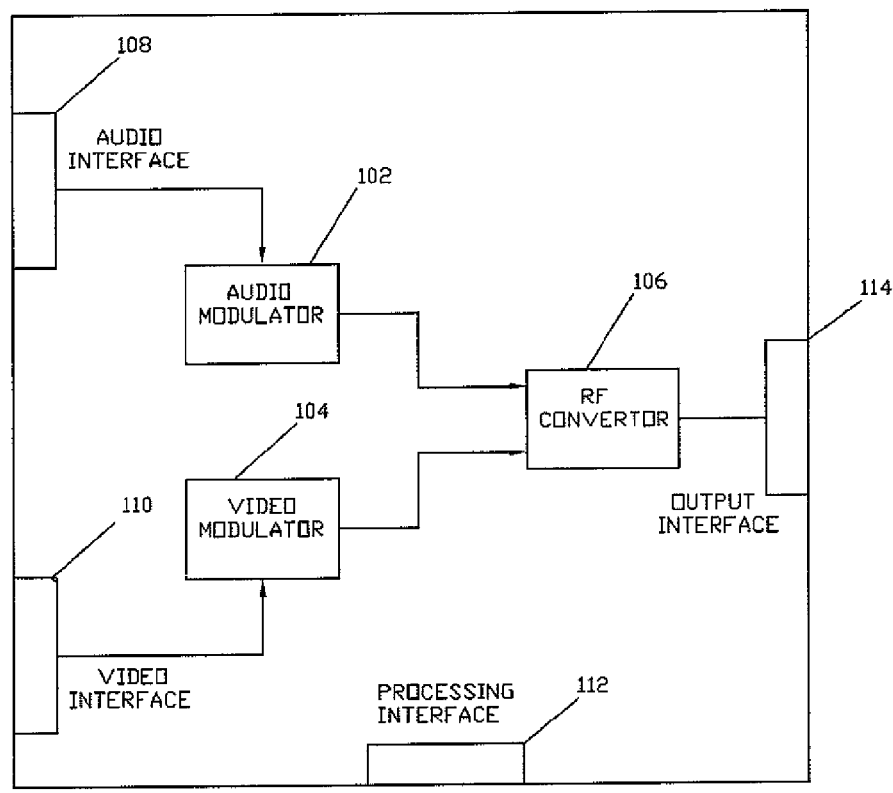
FIG. 1 illustrates a block diagram of a digital RF modulator.

FIG. 1 illustrates a block diagram of a digital RF modulator (100). The RF modulator (100) provides modulation of a base band TV signal at a desired RF channel carrier. The RF modulator (100) includes an audio modulator (102), a video modulator (104), a RF converter (106). The RF modulator (100) further includes an audio interface (108), a video interface (110), a processing interface (112), and an output interface (114) for providing interfacing among its components. The audio modulator (102) receives input audio signals through the audio interface (108) to generate frequency modulated (FM) audio signals. The video modulator (104) receives composite video base band signals (CVBS) through the video interface (110) to generate filtered output video signals. The RF converter (106) is connected to the audio modulator (102) and the video modulator (104) to construct the base band TV signal. The RF converter (106) further shifts the base band TV signal in a frequency domain to the desired RE channel carrier. The output interface (114) provides the modulated carrier samples to a digital to analog converter (DAC) followed by an analog low pass filter (LPF). The processing interface (112) configures the RF modulator (100) for connection with an external general purpose processor and an external memory module.

Figure 2:
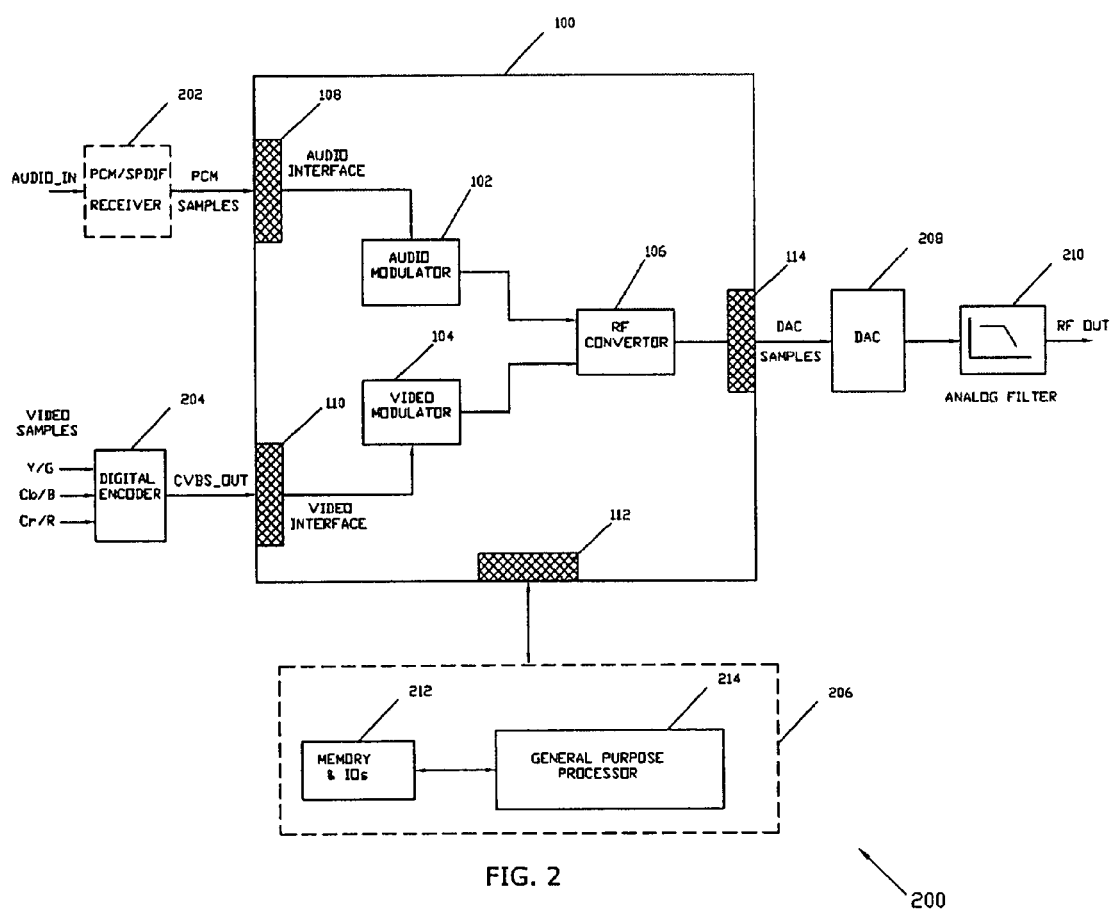
FIG. 2 illustrates a block diagram of the system in which the RF modulator can fit.

FIG. 2 illustrates a block diagram of an RF module system (200) which converts the digital base band audio signals and digital video component signals to a desired RE channel carrier after proper encoding of the component video signals. The RF module (200) includes the RF modulator (100), a PCM/SPDIF interface (202), a digital encoder (204), a digital circuit (206), a digital to analog converter (DAC) block (208), and an analog filter block (210). The RF modulator (100) internally generates the base band TV signal and modulates the desired channel carrier frequency. The PCM/SPDIF interface (202) is connected to the RF modulator (100) through the audio interface (108) to provide processed PCM audio signals to the audio modulator (102). The digital encoder (204) is connected to the RE modulator (100) through the video interface (110) to convert input video signals into composite video base band signals (CVBS) signal. The CVBS signal is defined by various standards like National Television Standards Committee (NTSC) and Phase Alternation Line (PAL) defined in the ITU-R 470.6 standard. If the video source generates RGB signals, then the digital encoder (204) converts the samples from RGB domain to the Y Cr Cb domain before generating the CVBS signals. The CVBS signals consist of the luma samples (Y samples), quadrature modulated chroma samples (Cr and Cb samples), blanking and sync signal. The CVBS signal is then applied to the RF modulator (100) through the video interface (110). The digital circuit (206) includes a memory and input/output IO's block (212), and a general purpose processor (214). The digital circuit (206) is connected to the RF modulator (100) through the processing interface (112) to configure the digital encoder (204) and the PCM/SPDIF receiver (202) and the RF modulator (100). The DAC block (208) is connected to the RF modulator (100) through the output interface (114) for converting the modulated RF carrier from digital to analog domain. The analog filter block (210) is connected to the DAC block (208) for filtering the output of the DAC to reject the images that occur at every sampled frequency and retain only the fundamental spectrum around 0 Hz. The final RF output signals are then transmitted or broadcasted to desired destinations.

Figure 3:
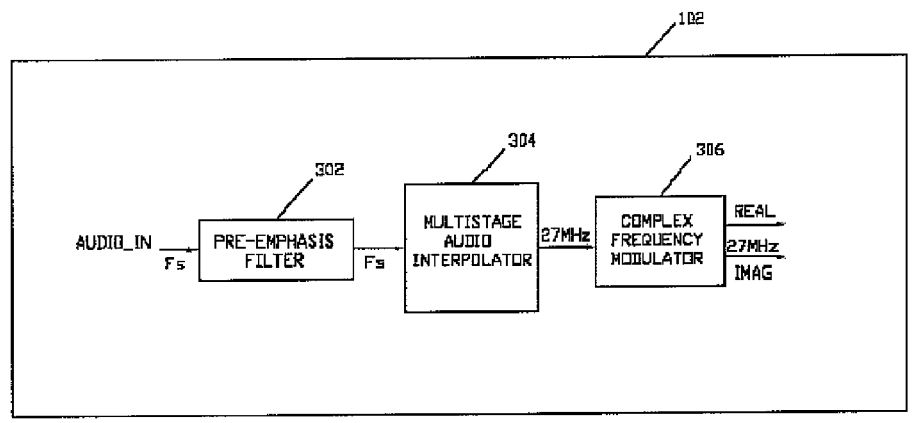
FIG. 3 shows a block diagram of an audio modulator.

FIG. 3 shows a block diagram of the audio modulator (102). The audio modulator (102) includes a pre-emphasis filter (302), a multi stage audio interpolator (304), and a complex frequency modulator (306). The cutoff frequency of the pre-emphasis filter is specified in ITU-R BT 470. The ideal magnitude response of the filter is such that it remains constant until the cutoff frequency and increases with a rate of 20 db/decade from there on. The pre-emphasis filter has a high-pass filter like response. The pre-emphasis filter (302) results in increased signal-to-noise ratio (SNR).

The multi stage audio interpolator (304) is connected to the pre-emphasis filter (302) to increase the sampling rate of the pre-emphasized audio signals. Typical audio sampling rates are 32 KHz/48 KHz/64 KHz/96 KHz/128 KHz/144 KHz/192 KHz. The output sampling rate of the multistage audio interpolator is twice the video pixel rate (2×13.5 MHz) which is 27 MHz.

Figure 6:
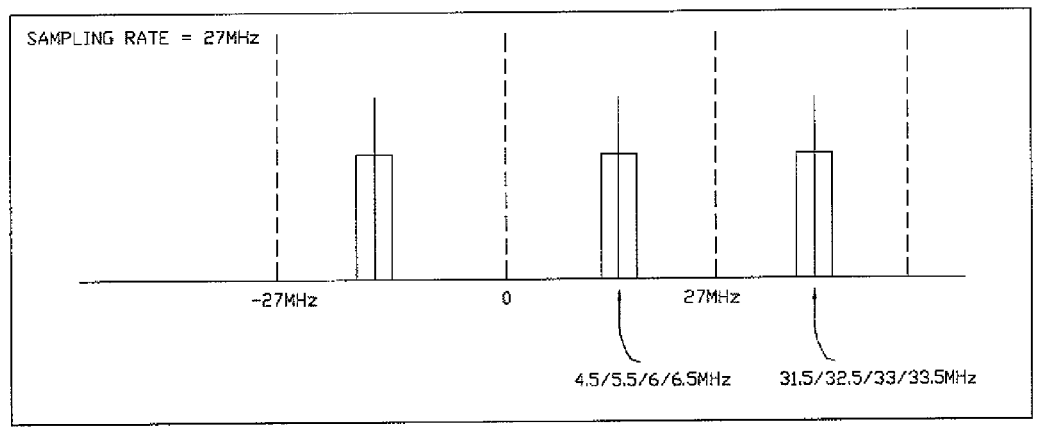
FIG. 6 illustrates the output spectrum of FM modulated audio signals.

The complex frequency modulator (306) is connected to the multi-stage audio interpolator (304) to modulate the exponential carrier with the interpolated audio signal. The frequency of the exponential carrier is programmable. The value to be programmed depends on the TV system targeted. Typical values of the audio carrier frequency are 4.5, 5.5, 6.5 MHz as defined by ITU-R 470.6 standard for different TV systems. Examples of TV standards include a National Television Standards Committee (NTSC) standard, a phase alternation line (PAL) standard, and a SECAM. The output frequency spectrum of the complex frequency modulator (306) is shown in FIG. 6.

Figure 4:
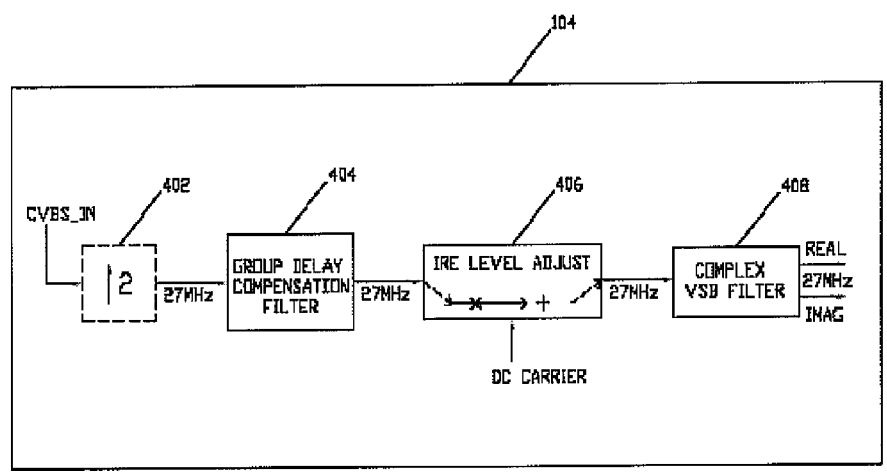
FIG. 4 shows a block diagram of a video modulator.

FIG. 4 shows a block diagram of the video modulator (104). The video modulator (104) includes a digital circuit (402), a group delay compensation filter (404), an IRE level adjustor (406), and a complex VSB filter (408). Generally, the digital encoders take incoming video data at 13.5 MHz pixel rate, and up-sample it to 27 MHz frequency to construct the base band signal. The digital circuit (402) is used for up-sampling the incoming CVBS signal by a factor of 2, if the sampling rate of the incoming signal is 13.5 MHz. This block is not required if the sampling rate of the incoming CVBS signal is already 27 MHz. The upsampling can be achieved by using a simple interpolation filter.

The group delay compensation filter (404) is connected with the digital circuit (402) for pre-correcting the non-linear phase characteristics of a receiver. The group delay compensation filter (404) is an all-pass filter with the group delay characteristics as defined in the ITU-R BT.470.

The IRE level adjustor (406) is connected with the group delay compensation filter (404) for scaling and adding the output of the group delay compensation filter with pre-calculated values which are programmable. This operation is required to adjust the amplitude levels of the CVBS signal. This adjustment is required so that the signal meets the percentage modulation requirements (for example the percentage modulation of the sync level is 100%) of the ITU-R BT 470. The addition factor also contains the value that is required to be added to represent carrier addition at baseband.

Figure 7:
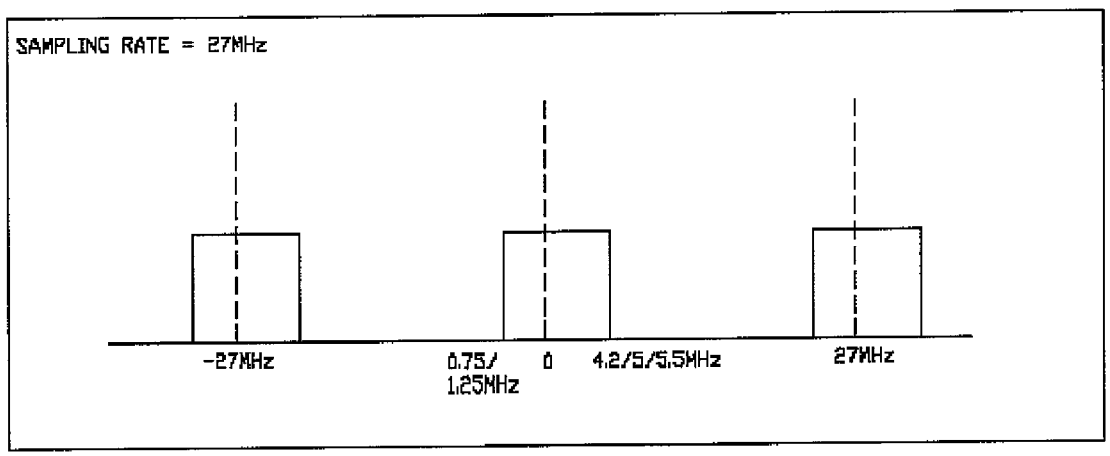
FIG. 7 illustrates the output spectrum of an output of a VSB filter.

The complex VSB filter (408) is connected to the IRE level adjustor (406) for generating a vestige of one of the sidebands and limiting the bandwidth of the other sideband in order to avoid video interference into the audio spectrum. The complex VSB filter (408) is a symmetric coefficients FIR filter so that the phase response is linear. The complex VSB filter (408) operates at a base band sampling frequency of 27 MHz. The bandwidth of the complex VSB filter (408) depends on a targeted TV system. Since the filter is complex in nature (complex valued coefficients), the magnitude response is asymmetric across 0 Hz. The output spectrum at output of the complex VSB filter (408) is shown in FIG. 7.

Figure 5:
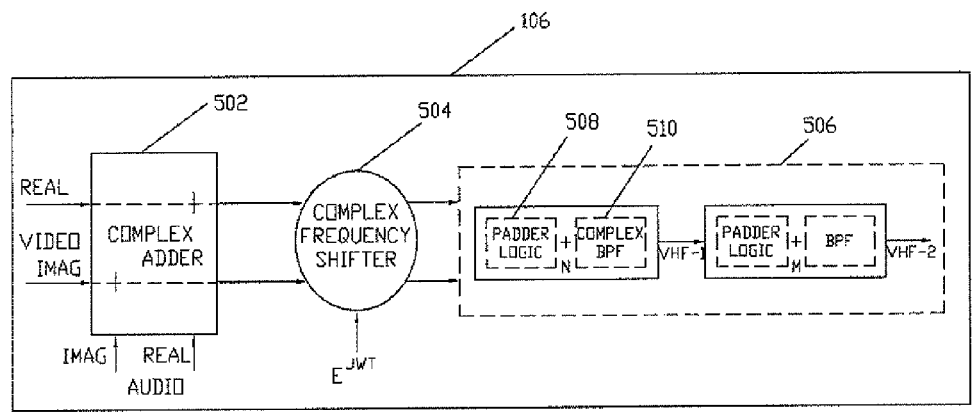
FIG. 5 shows a block diagram of a RF converter.
Figure 8:
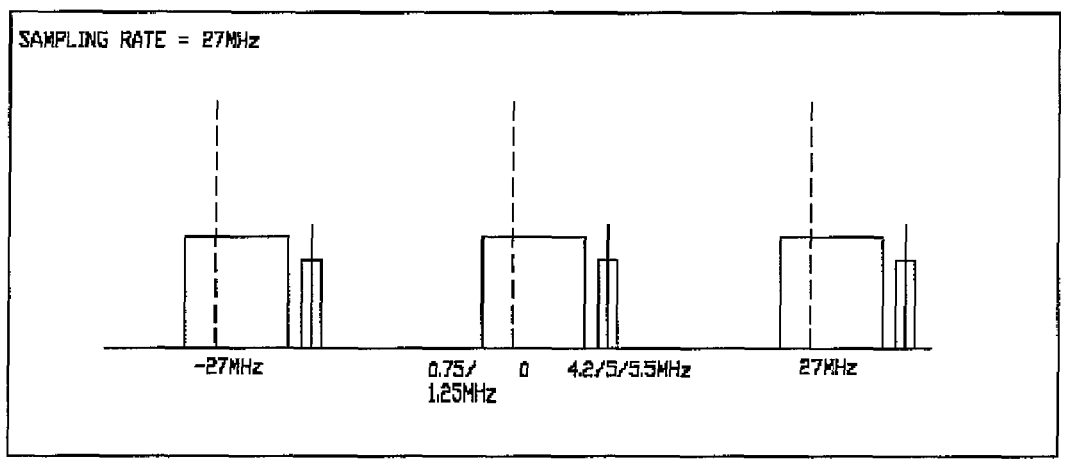
FIG. 8 illustrates the spectrum of the base band TV signals.

FIG. 5 shows a block diagram of the RF converter (106). The RF converter (106) includes a complex adder (502), a complex frequency shifter (504), and a RF interpolator (506). The complex adder (502) includes two simple adders, which adds the frequency modulated audio signals (from the audio modulator 102) with the filtered output video signal (from the video modulator 104). The complex adder (502) works at 27 MHz to form the base band TV signal. The spectrum of the base band TV signal is shown in the FIG. 8.

The complex frequency shifter (504) is connected to the complex adder (502) for multiplying the base band TV signal with an exponential carrier value to shift the base band TV signal uni-directionally by the frequency of the exponential carrier. The exponential carrier value lies within a range of +/−13.5 MHz. The complex frequency shifter (504) works at 27 MHz sampling rate.

The frequency of the exponential carrier determines the required channel frequency.

EXAMPLE 1

Assume that a required channel carrier frequency is 62 MHz. In order to bring the image at 54 MHz to 62 MHz, there is a need to shift the image by 8 MHz towards right, so in this case exponential carrier frequency of 8 MHz should be chosen.

EXAMPLE 2

Now, assume that a required channel carrier frequency is 70 MHz. So, an exponential carrier frequency of 16 MHz (70-54) will be chosen to shift the image at 54 MHz to 70 MHz, but this carrier can not be generated at a sampling rate of 27 MHz.

However, we can bring the image at 81 MHz to 70 MHz by using an exponential carrier of −11 MHz frequency, which can be generated with a 27 MHz sampling rate.

To generalize, the frequency of an exponential carrier is either (Fch−n*27 MHz) or (Fch−(n+1)*27 MHz) whichever value lies in the range of +/−13.5 MHz, where Fch is the desired channel carrier frequency and n is an integer.

Figure 9:
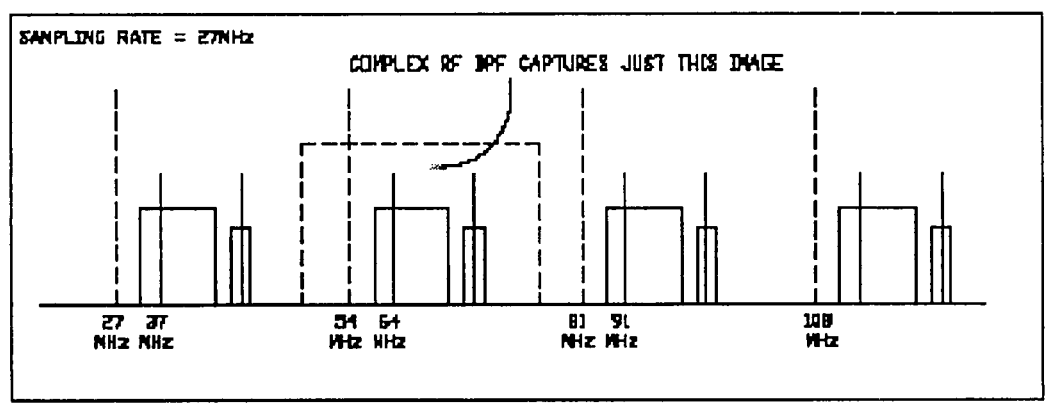
FIG. 9 illustrates the unidirectional shift of the spectrum by +10 MHz frequency in an embodiment.

After a complex multiplication, the video carrier also gets inserted automatically due to an initial DC addition in a video processor block. The spectrum after the uni-directional frequency shift of 10 MHz (required channel carrier frequency=64 MHz) is shown in FIG. 9.

The RF interpolator (506) is connected to the complex frequency shifter (504) for generating a modulator output at a higher sampling rate. The output samples after complex multiplication are passed through a zero-padder block (508). The zero padder block (508) inserts a sufficient number of logical 0s between two input samples. Zero-padding by N (N is an integer) implies we need to insert N−1 zeros between two adjacent samples.

Zero padding not only increases the sampling rate by N times (27*N MHz), but also causes the N replicas of the initial spectrum to appear across the new sampling rate.

Figure 10:
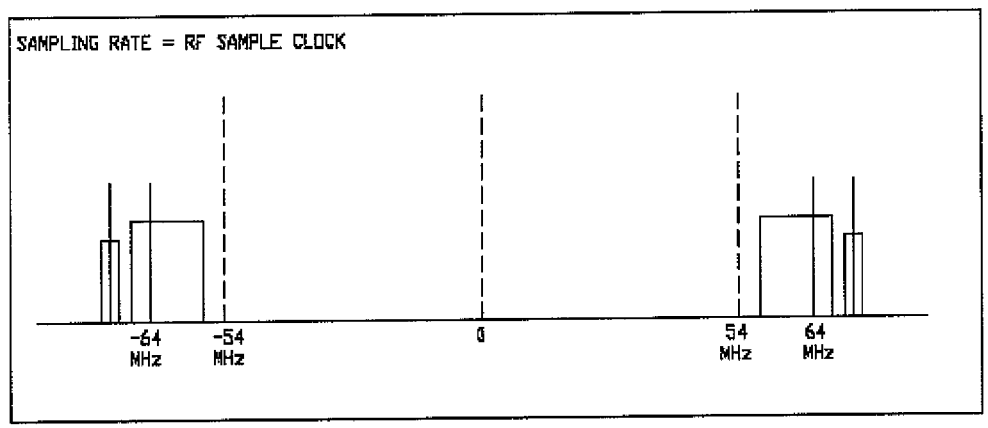
FIG. 10 shows a resultant spectrum after passing through upsampler and a quadrature band pass filter in an embodiment.

These samples are then provided as input to a quadrature band pass filter to select the spectrum replica of interest (containing the desired channel frequency). After the quadrature band pass filter, the resultant spectrum for a channel frequency of 64 MHz is shown in the FIG. 10.

The zero-padding block (508) and the BPF (510) can be merged together as a poly-phase structure in which each poly-phase structure effectively operates at 27 MHz only. The output data rate of the BPF is the desired sample rate.

The following description explains the process of generating an output at various bands (VHF/UHF).

VHF Band Up to 85 MHz

The lower VHF band implies a channel carrier whose frequency is less than 80-85 MHz. The lower VHF also covers VCR outputs and up to TV channel 6. The sample rate must be increased from 27 MHz to a higher value for generating an RF modulated output. The increased sample rate is a multiple of 27 MHz for simplicity in interpolation (interpolation factor becomes an integer). For generating a VHF band output whose channel carrier frequencies are less than 85 MHz, the possible choices of the output sample rates are 189/216/243/270 MHz (multiples of 27 MHz) and so on. If we choose 243 as an output sample rate, then we need to interpolate it by 9 times (N=9).

VHF Band Up to 250 MHz.

The upper VHF band implies channel frequencies up to 250 MHz. For generating a VHF band output with channel carrier frequency less than 250 MHz, the desired sample rate should be greater than 600 MHz (after allowing some guard band in the spectrum), which results in a large interpolation factor. It would be expensive (requires high order BPF) to perform the RF interpolation (zero-pad+quadrature BPF) in one step. In this case, there are two stages of interpolation, in which the first stage interpolates the samples to 243 MHz using a 9 times zero-padder followed by quadrature BPF and the second stage interpolates the samples by 3 times (M=3) (243*3=729 MHz) using a 3 times zero-padder followed by real band pass filter (BPF). Both the band pass filters can be optimized to implement in a polyphase structure because of the zero-padder logic preceding them.

For supporting UHF band (up to 1.1 GHz), the final analog VHF-II channel output may be treated as an IF (intermediate frequency) input to an analog converter, which moves it to desired UHF channel frequency.

Figure 11:
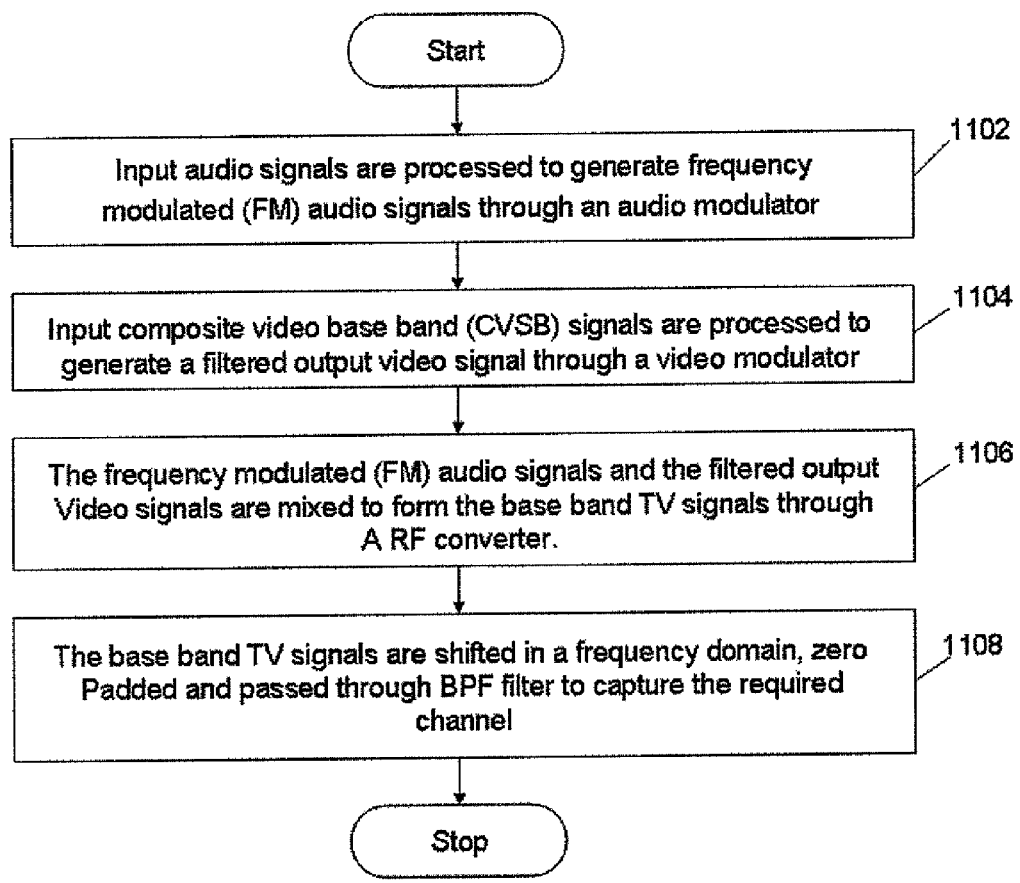
FIG. 11 shows a flow diagram of a method for modulating the base band TV signals to a desired RF channel carrier.

FIG. 11 shows a flow diagram of a method for modulating the base band TV signals to a desired RF channel carrier in accordance with the present invention. At step 1102, input audio signals are processed to generate frequency modulated (FM) audio signals through an audio modulator. At step 1104, input composite video base-band (CVBS) signals are processed to generate a filtered output video signal through a video modulator. At step 1106, the frequency modulated (FM) audio signals and the filtered output video signals are mixed to form the base band TV signals through a RF converter. At step 1108, the base band TV signals are shifted in a frequency domain, upsampled, passed through quadrature band pass filter and an optional upsampler followed by a real bandpass filter, if the desired band is in the higher VHF range, to capture the required RF channel.

The proposed digital RF modulator offers various advantages. The RF modulator provides direct conversion of digital base-band audio and video TV signals to a desired RF channel frequency, without any analog up conversion at higher frequencies. The proposed RE modulator provides generic channel frequency and generates sinusoidal carrier at a lower sampling rate for enhancing the efficiency. The band pass filter that selects the desired channel is implemented in a polyphase structure. The proposed approach provides digital conversion of base band TV signals directly to any frequency up to higher VHF band, which is much simpler, flexible, robust as well as cost effective as compared to full analog up conversion from baseband TV signal.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed:

1. A digital radio frequency (RF) modulator for modulating a base-band TV signal with a RF channel carrier frequency, said digital RF modulator comprising:

an audio modulator configured to receive input audio signals and generate frequency modulated (FM) audio carrier;

a video modulator configured to receive a composite video base-band signal (CVBS) and generate a filtered output video signal; and a RF converter connected to said audio modulator and said video modulator, said RF converter comprising:

a complex adder configured to add the frequency modulated (FM) audio signals and the filtered output video signal to form a first sampling rate base-band TV signal having a first plurality of spectrum images;

a complex frequency shifter configured to receive the first sampling rate base-band TV signal from an output of said complex adder and multiply the first sampling rate base-band TV signal with an exponential carrier having a frequency selected from a range of frequencies so as to frequency shift one of the plurality of spectrum images of the first sampling rate base-band TV signal uni-directionally by the selected frequency of the exponential carrier to a location at the RF channel carrier frequency; and a RF interpolator configured to receive the frequency shifted selected spectrum image of the first sampling rate base-band TV signal from said complex frequency shifter and increase said first sampling rate by a factor of N>1 to a second sampling rate.

2. The digital modulator as claimed in claim 1 further comprising an audio interface configured to provide the input audio signals to said audio modulator.

3. The digital modulator as claimed in claim 1 further comprising a video interface configured to provide the composite video base-band signal (CVBS) to said video modulator.

4. The digital modulator as claimed in claim 1 further comprising an output interface configured to provide the modulated base-band TV signal to a DAC.

5. The digital modulator as claimed in claim 1 further comprising a processing interface for configuring the digital RF modulator to communicate with one or more of a general purpose processor and a memory module.

6. The digital modulator as claimed in claim 1, said audio modulator comprising:

a pre-emphasis filter configured to amplify high frequency input audio signals and output pre-emphasized audio signals;

a multi stage audio interpolator configured to increase an audio sampling rate of said pre-emphasized audio signals and generate interpolated audio samples; and a complex frequency modulator configured to frequency modulate the interpolated audio samples with an exponential carrier.

7. The digital modulator as claimed in claim 1, said video modulator comprising:

a group delay compensation filter configured to pre-correct for non linear phase characteristics of a receiver;

an IRE level adjustor configured for scaling the composite video base-band signal CVBS with pre-calculated constant values; and a complex VSB filter configured to pass only one complete sideband and a vestige of another sideband.

8. The digital modulator as claimed in claim 7, wherein said VSB filter has a programmable bandwidth dependent on a targeted television system.

9. The digital modulator as claimed in claim 8, wherein said targeted television system is one of a National Television Standards Committee (NTSC) system, a phase alternation line (PAL) system, and a SECAM system.

10. The digital modulator as claimed in claim 1, said RF interpolator producing a second plurality of spectrum images of said base-band TV signal, said RF converter further comprising: a complex bandpass filter centered at the RF channel carrier frequency and configured to select one of the second plurality of spectrum images centered at the RF channel carrier frequency.

11. The digital modulator as claimed in claim 10, wherein said range of frequencies of the exponential carrier lies in a range of +/−said first sampling rate/2 MHz.

12. The digital modulator as claimed in claim 1, wherein said RF interpolator is operable to increase said first sampling rate by the factor of N>1 to the second sampling rate comprises by inserting N−1 logical zeroes between two consecutive samples of the frequency shifted selected spectrum image of the first sampling rate base-band TV signal.

13. The digital modulator as claimed in claim 1, wherein said RF interpolator is further configured to increase said second sampling rate base-band TV signal by a factor of M>1 to a third sampling rate.

14. The digital modulator as claimed in claim 13, wherein said RF interpolator is operable to increase said second sampling rate by the factor of M>1 to the third sampling rate comprises inserting M−1 logical zeroes between two consecutive samples of the frequency shifted selected spectrum image of the second sampling rate base-band TV signal.

15. The digital modulator as claimed in claim 13 said increasing producing a third plurality of spectrum images of said base-band TV signal, said RF interpolator further comprising a bandpass filter operable to select one of the third plurality of spectrum images centered at another RF channel carrier frequency.

16. A method of modulating base-band TV signals to an RF channel carrier frequency, said method comprising:
   processing input audio signals to generate frequency modulated (FM) audio signals through an audio modulator;
   processing input composite video base-band (CVBS) signals to generate a filtered output video signal through a video modulator;
   adding the frequency modulated (FM) audio signals and the filtered output video signals to form a first sampling rate base-band TV signal having a first plurality of spectrum images;
   shifting one of the first plurality of spectrum images of the first sampling rate base-band TV signal in a frequency domain to a location of the RF channel carrier frequency by multiplying with an exponential carrier having a frequency selected from a range of frequencies; and
   increasing said first sampling rate by a factor of N>1 to a second sampling rate through an interpolation of the frequency shifted selected spectrum image of the first sampling rate base-band TV signal.

17. The method as claimed in claim 16, said processing the input audio signals comprising:
   amplifying high frequency input audio signals through a pre-emphasis filter;
   increasing audio sampling rate of pre-emphasized audio signals through a multi stage audio interpolator; and
   modulating the frequency of an exponential carrier with the interpolated audio samples through a complex frequency modulator.

18. The method as claimed in claim 16, said processing the input composite video base-band (CVBS) signals comprising:
   sampling the input CVBS signals to twice a pixel rate through an interpolator if the input CVBS samples are at the pixel rate;
   pre-correcting non linear phase characteristics of a receiver through a group delay compensation filter;
   adjusting the amplitude of the CVBS signal through an IRE level adjustor; and
   generating a VSB spectrum through a complex VSB filter.

19. The method as claimed in claim 16, said increasing producing a second plurality of spectrum images of said base-band TV signal, said method further comprising bandpass filtering to select one of the second plurality of spectrum images centered at the RF channel carrier frequency.

20. The method as claimed in claim 16, wherein increasing said first sampling rate by the factor of N>1 to the second sampling rate comprises inserting N−1 logical zeroes between two consecutive samples of the frequency shifted selected spectrum image of the first sampling rate base-band TV signal.

21. The method as claimed in claim 16, further comprising increasing said second sampling rate by a factor of M>1 to a third sampling rate through an interpolation of the frequency shifted selected spectrum image of the second sampling rate base-band TV signal.

22. The method as claimed in claim 21, wherein increasing said second sampling rate by the factor of M>1 to the third sampling rate comprises inserting M−1 logical zeroes between two consecutive samples of the frequency shifted selected spectrum image of the second sampling rate base-band TV signal.

23. The method as claimed in claim 21, said increasing producing a third plurality of spectrum images of said base-band TV signal, said method further comprising bandpass filtering to select one of the third plurality of spectrum images centered at another RF channel carrier frequency.

24. The method as claimed in claim 16, wherein said range of frequencies of the exponential carrier lies in a range of +/−said first sampling rate/2.

25. A processing system for processing a frequency modulated (FM) audio carrier and a composite video base-band signal (CVBS), comprising
   an addition process operable to add the frequency modulated (FM) audio signal and a filtered version of the composite video base-band signal to form a first sampling rate base-band TV signal having a first plurality of spectrum images;
   a complex frequency shifting process operable to multiply the first sampling rate base-band TV signal with an exponential carrier having a frequency selected from a range of frequencies so as to frequency shift one of the plurality of spectrum images of the first sampling rate base-band TV signal uni-directionally by the selected frequency of the exponential carrier to a location at a first RF channel frequency; and
   an RF interpolation process operable to increase said first sampling rate of the frequency shifted selected spectrum image of the first sampling rate base-band TV signal by a factor of N>1 to a second sampling rate.

26. The processing system of claim 25, wherein said range of frequencies of the exponential carrier lies in a range of +/−said first sampling rate/2.

27. The processing system of claim 25, said RF interpolator process producing a second plurality of spectrum images of said base-band TV signal, and further comprising a complex bandpass filtering process operable to select one of the second plurality of spectrum images centered at the first RF channel frequency.

28. The processing system of claim 25, wherein said RF interpolation process is configured to insert N−1 logical zeroes between two consecutive samples of the frequency shifted selected spectrum image of the first sampling rate base-band TV signal.

29. The processing system of claim 25, further comprising an additional RF interpolation process operable to increase said second sampling rate base-band TV signal by a factor of M>1 to a third sampling rate.

30. The processing system of claim 29, wherein said RF interpolation process is configured to insert M−1 logical zeroes between two consecutive samples of the frequency shifted selected spectrum image of the second sampling rate base-band TV signal.

31. The processing system of claim 29, said increasing producing a third plurality of spectrum images of said base-band TV signal, and further comprising a bandpass filtering process operable to select one of the third plurality of spectrum images centered at a second RF channel frequency.

* * * * *

UNITED STATES PATENT AND TRADEMARK OFFICE
CERTIFICATE OF CORRECTION

PATENT NO. : 8,184,210 B2  Page 1 of 1
APPLICATION NO. : 11/841678
DATED : May 22, 2012
INVENTOR(S) : Vivek Mohan Sharma et al.

It is certified that error appears in the above-identified patent and that said Letters Patent is hereby corrected as shown below:

On the Title Page:

Item (73), please replace Assignee's name [STMicroelectronics International, Amsterdam (NL)] with -- STMicroelectronics International, N.V., Amsterdam (NL) --.

At column 1, line number 16, please replace the words [frequency RF)] with the words -- frequency (RF) --.

At column 4, line number 12, please replace [RE] with -- RF --.

At column 4, line number 20, please replace [RE] with -- RF --.

At column 4, line number 31, please replace [RE] with -- RF --.

At column 7, line number 46, please replace [RE] with -- RF --.

Signed and Sealed this
Tenth Day of July, 2012

David J. Kappos
*Director of the United States Patent and Trademark Office*